(12) United States Patent
Kim et al.

(10) Patent No.: US 7,668,052 B2
(45) Date of Patent: Feb. 23, 2010

(54) APPARATUS AND METHOD FOR DETECTING TRACKING ERROR SIGNAL USING MULTIPLE PHASE CLOCKS

(75) Inventors: Je-kook Kim, Yongin-si (KR); Jun-ho Huh, Yongin-si (KR); Sang-hoon Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 11/492,804

(22) Filed: Jul. 26, 2006

(65) Prior Publication Data
US 2007/0025216 A1 Feb. 1, 2007

(30) Foreign Application Priority Data
Jul. 27, 2005 (KR) .................... 10-2005-0068539

(51) Int. Cl.
G11B 7/00 (2006.01)
(52) U.S. Cl. .............. 369/44.25; 369/44.29; 369/53.28; 369/53.2
(58) Field of Classification Search .............. 369/44.25, 369/44.29, 44.35, 47.28
See application file for complete search history.

(56) References Cited

U.S. PATENT DOCUMENTS 6,236,628 B1   5/2001   Kim

| | | | |
|---|---|---|---|
| 6,741,533 B1* | 5/2004 | Hiratsuka et al. | 369/44.41 |
| 7,012,862 B2 | 3/2006 | Hiratsuka | |
| 7,102,967 B1* | 9/2006 | Ma et al. | 369/44.25 |
| 7,239,583 B2* | 7/2007 | Hiratsuka et al. | 369/44.41 |
| 7,277,367 B2* | 10/2007 | Takehara | 369/44.35 |
| 7,289,399 B2* | 10/2007 | Hiratsuka | 369/44.28 |
| 7,310,291 B2* | 12/2007 | Ma et al. | 369/44.29 |
| 2001/0028613 A1* | 10/2001 | Okamoto et al. | 369/44.25 |
| 2004/0151089 A1 | 8/2004 | Buchler et al. | |

FOREIGN PATENT DOCUMENTS

| | | |
|---|---|---|
| JP | 2001-243643 | 9/2001 |
| JP | 2003-030879 | 1/2003 |
| KR | 1999-0080092 | 11/1999 |

* cited by examiner

*Primary Examiner*—Wayne R Young
*Assistant Examiner*—Brenda Bernardi
(74) *Attorney, Agent, or Firm*—Lee & Morse, P.C.

(57) ABSTRACT

An apparatus and method for digitally detecting a tracking error signal using multiple phase clocks. The apparatus includes a phase extractor receiving four divided outputs in response to light reflected from an optical disk and extracting four divided phases, respectively, a phase difference detector detecting phase differences between two phases among the four divided phases, a multiple phase clock generator generating a plurality of phase clocks in response to a predetermined clock signal, a phase error detector counting phase differences in response to each of the plurality of phase clocks, summing the counted phase differences, and detecting a phase error, and a tracking error output unit detecting the tracking error signal in response to the phase error and outputting the detected tracking error signal.

25 Claims, 5 Drawing Sheets

DELAY

APPARATUS AND METHOD FOR DETECTING TRACKING ERROR SIGNAL USING MULTIPLE PHASE CLOCKS

BACKGROUND OF THE INVENTION

1. Field of the Invention

The present invention relates to an apparatus and method for detecting a tracking error signal. More particularly, the present invention relates to an apparatus and method for digitally detecting a tracking error signal using multiple phase clocks.

2. Description of the Related Art

Optical disk recording reproducers may reproduce data recorded in optical disks, e.g., compact discs (CD), digital versatile discs (DVD), etc., by restoring radio frequency (RF) signals from the optical disks. More specifically, optical disk recording reproducers may irradiate light onto optical disks, detect reflected light with detectors, e.g., photodiodes (PD), generate RF signals from the detected light, and divide the generated RF signals according to a predetermined level to restore data.

Optical disk recording reproducers may also detect tracking errors so as to exactly track optical disks. Optical disk recording reproducers may detect tracking error signals using reflected light, and may correct tracking errors using tracking error signals. Differential phase detection (DPD) may be used to detect tracking error signals.

Figure 1:
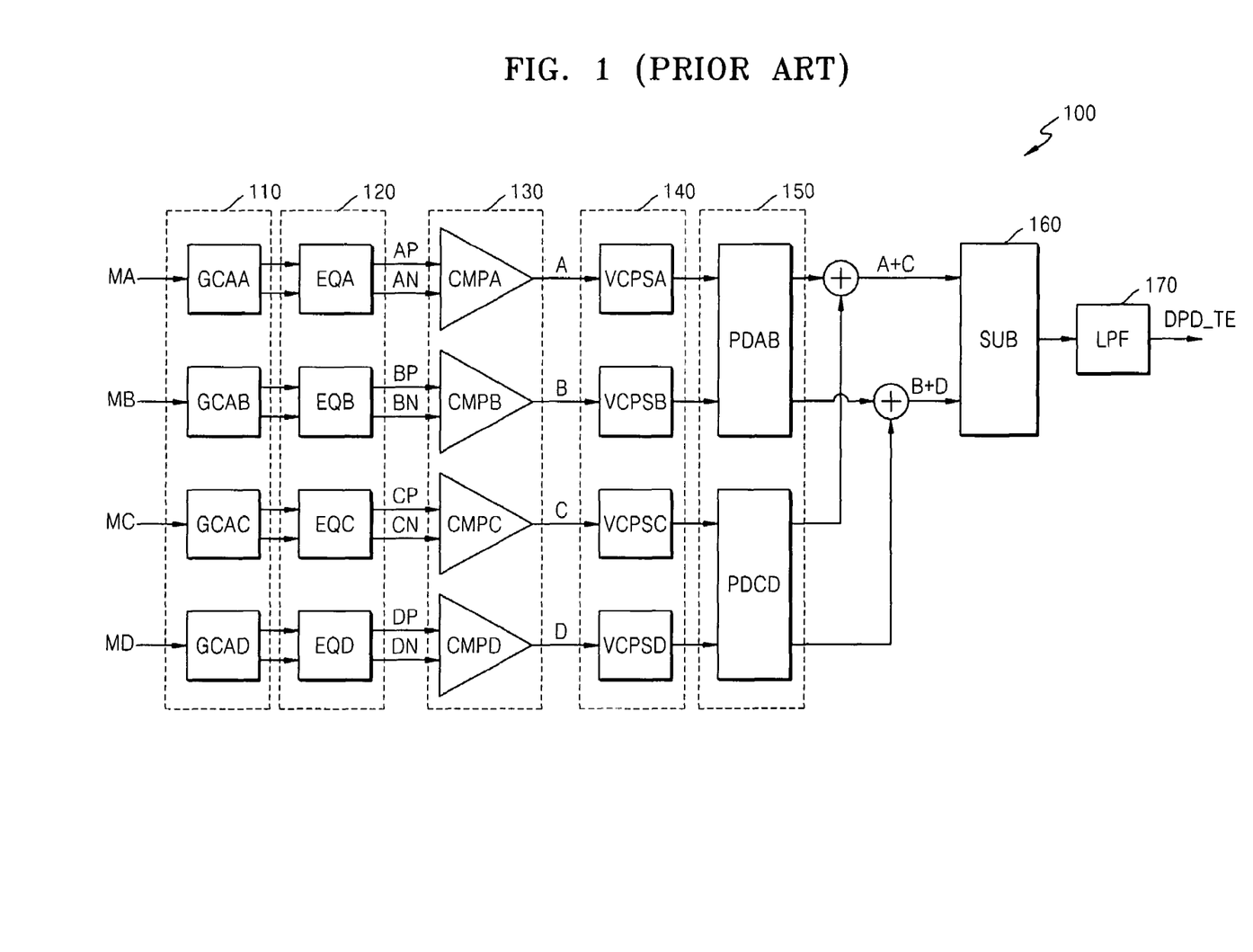
FIG. 1 illustrates a block diagram of a conventional apparatus for detecting a tracking error signal.

FIG. 1 illustrates a block diagram of a conventional apparatus 100 for detecting a tracking error signal. Referring to FIG. 1, the apparatus 100 for detecting the tracking error signal may include gain controlled amplifiers GCAA, GCAB, GCAC, and GCAD 110, equalizers EQA, EQB, EQC, and EQD 120, comparators CMPA, CMPB, CMPC, and CMPD 130, voltage controlled phase shifters VCPSA, VCPSB, VCPSC, and VCPSD 140, phase detectors PDAB and PDCD 150, a subtractor SUB 160, and a low pass filter (LPF) 170.

The apparatus 100 for detecting the tracking error signal may receive signals output by a photo detector (not shown). The photo detector may convert four divided lights into electrical signals MA, MB, MC, and MD. The gain controlled amplifiers 110 may receive the electrical signals MA, MB, MC, and MD, and may output differential signals AP and AN, BP and BN, CP and CN, and DP and DN, having opposite phases, respectively, through the equalizers 120, respectively, in which intensity variations of the differential signals AP and AN, BP and BN, CP and CN, and DP and DN, may be corrected according to differences in amplitude of vibrations and pit lengths.

The comparators 130 may compare the differential signals AP and AN, BP and BN, CP and CN, and DP and DN, and may extract phases A, B, C, and D. The voltage controlled phase shifters 140 may control values of the phases A, B, C, and D. The phase detectors 150 may detect phase differences using the phases A, B, C, and D having controlled values.

Among the detected phase differences, two phase differences, e.g., A and C, and B and D, may be respectively added. The subtractor 160 may receive the two added phase differences, and may subtract the two added phase differences, e.g., subtract B+D from A+C. The LPF 170 may remove ripple and noise of the subtracted signal, thereby producing a tracking error signal DPD_TE.

Since a width of a phase error is reduced as a disk speed increases, the apparatus 100 may require a clock having a high frequency, so as to directly count phase differences. However, there may be a limit as to how high a clock frequency may be realized in a given system.

Also, when receiving high frequency signals, the apparatus 100 may use an analog method based on pulse width modulation (PWM) integration to extract phase errors. When the apparatus 100 detects the tracking error signal using PWM integration, a digital-analog converter that generates a control voltage may be needed for the voltage controlled phase shifters VCPSA, VCPSB, VCPSC, and VCPSD 140. When the phase differences are output as PWM signals, an analog passive filter that converts PWM signals into analog signals may be needed.

Optical disk recording reproducers may be digitized and integrated as a system on chip (SoC). Thus, digitization of the apparatus 100 may be required for optical disk recording reproducers.

However, as noted above, when the apparatus 100 uses PWM integration, a digital-analog converter and an analog passive filter are needed. Also, since the tracking error signal has a low frequency, the apparatus 100 for detecting the tracking error signal needs a high level LPF that generates the low frequency tracking error signal. Since it is difficult to digitize the digital-analog converter, the analog passive filter, and the high level LPF, it is very difficult to realize the apparatus 100 for detecting the tracking error signal as a digital circuit or SoC.

SUMMARY OF THE INVENTION

The present invention is therefore directed to an apparatus and method for detecting a tracking error signal, which substantially overcome one or more of the problems due to the limitations and disadvantages of the related art.

It is therefore a feature of an embodiment of the present invention to provide an apparatus and method for digitally detecting a tracking error signal.

It is therefore another feature of an embodiment of the present invention is to provide an apparatus and method for detecting a tracking error signal using multiple phase clocks.

At least one of the above and other features and advantages of the present invention may be realized by providing an apparatus for detecting a tracking error signal including a phase extractor receiving four divided outputs in response to light reflected from an optical disk and extracting four divided phases, respectively, a phase difference detector for detecting phase differences between two phases among the four divided phases, a multiple phase clock generator for generating a plurality of phase clocks in response to a predetermined clock signal, a phase error detector for counting phase differences in response to each of the plurality of phase clocks, summing the counted phase differences, and detecting a phase error, and a tracking error output unit for detecting the tracking error signal in response to the phase error and outputting the detected tracking error signal.

At least one of the above and other features and advantages of the present invention may be also realized by providing a method of detecting a tracking error signal including, receiving four divided outputs in response to light reflected from an optical disk and extracting four divided phases, respectively, detecting phase differences between two phases among the four divided phases, generating a plurality of phase clocks in response to a predetermined clock signal, counting the phase differences in response to each of the plurality of phase clocks, summing the counted phase differences, and detecting a phase error, and detecting the tracking error signal in response to the phase error and outputting the detected tracking error signal.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 10-2005-0068539, filed on Jul. 27, 2005, in the Korean Intellectual Property Office, and entitled: "Apparatus and Method for Detecting Tracking Error Signal Using Multiple Phase Clocks," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

According to an embodiment of the present invention, an apparatus and method for detecting a tracking error signal may detect a phase error of a phase extracted from a digital region, making it easier to realize a system on chip (SoC) and simplifying a system for reproducing optical disk recordings.

Figure 2:
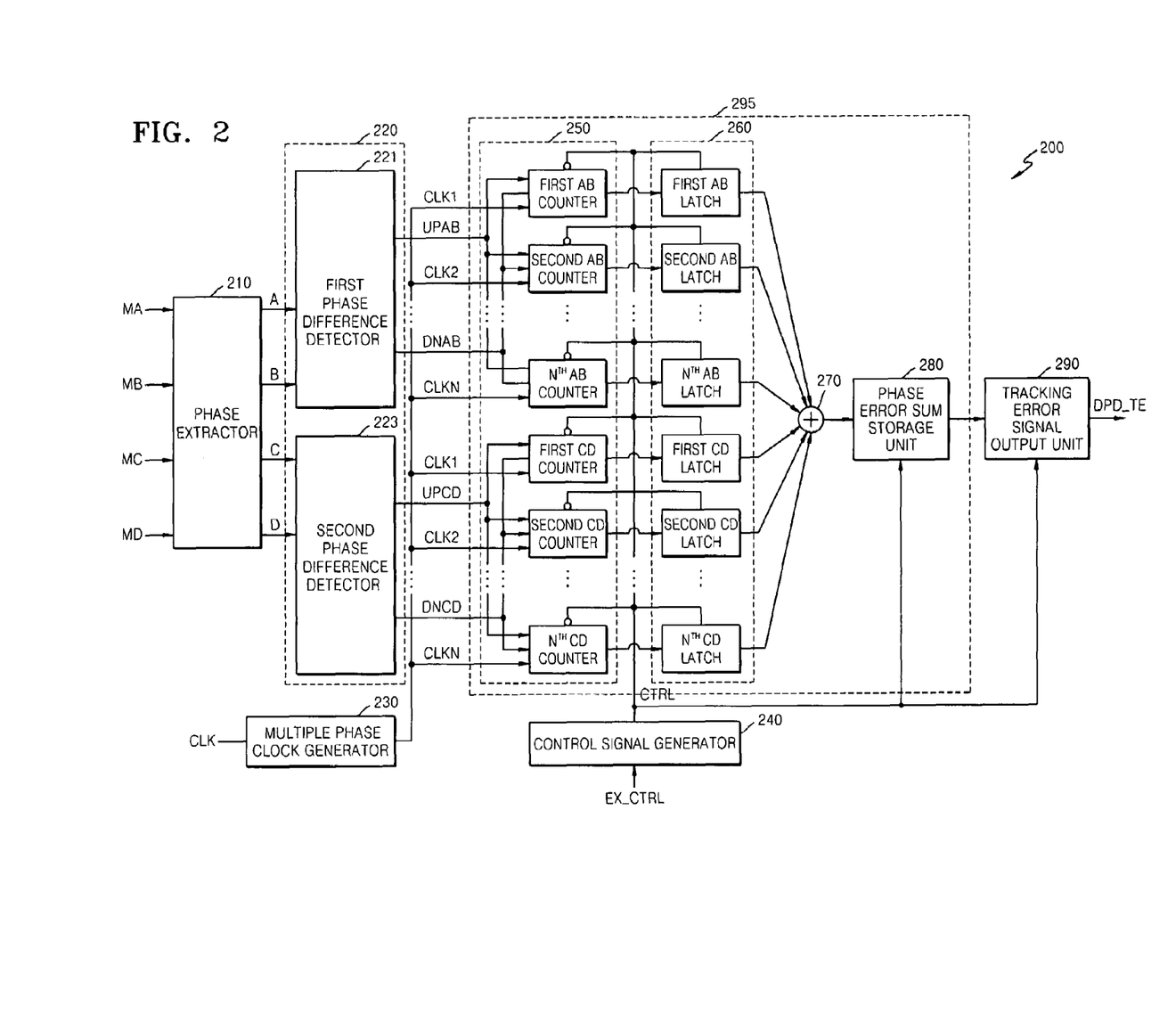
FIG. 2 illustrates a block diagram of an apparatus for detecting a tracking error signal according to an embodiment of the present invention.

FIG. 2 illustrates a block diagram of an apparatus 200 for detecting a tracking error signal according to an embodiment of the present invention. Referring to FIG. 2, the apparatus 200 for detecting the tracking error signal may include a phase extractor 210, a phase difference detector 220, a multiple phase clock generator 230, a phase error detector 295, and a tracking error signal output unit 290. The phase extractor 210 may receive four divided outputs MA, MB, MC, and MD in response to light reflected from an optical disk, and may extract four divided phases A, B, C, and D, respectively. The phase extractor 210 may extract the four divided phases A, B, C, and D using the same method as described in the conventional apparatus 100 for detecting a tracking error signal illustrated in FIG. 1.

Figure 6:
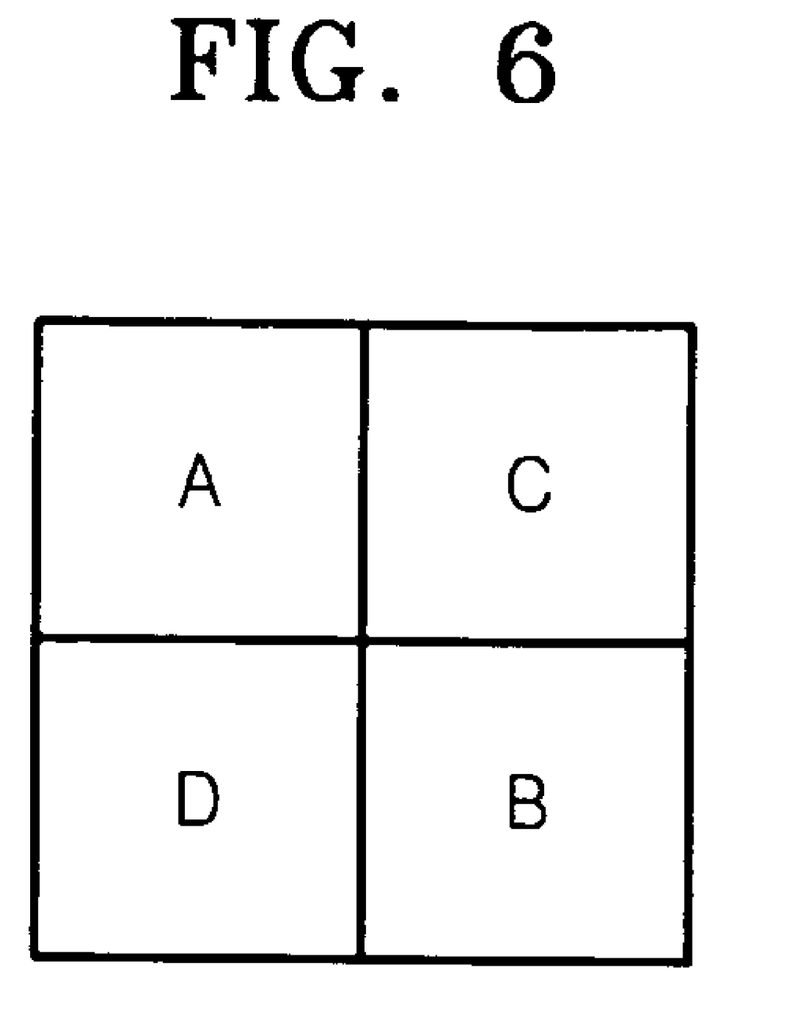
FIG. 6 illustrates an arrangement of divided regions on a photodetector for use with the present invention.

The phase difference detector 220 may include a first phase difference detector 221 and a second phase difference detector 223 that detect a phase difference between two phases among the four divided phases A, B, C, and D. The photodetector may be divided as shown in FIG. 6.

The first phase difference detector 221 may detect a phase difference between the first and second phases A and B corresponding to the two outputs MA and MB facing each other diagonally among the four divided outputs MA, MB, MC, and MD, and may output up-flag and down-flag signals UPAB and DNAB.

The second phase difference detector 223 may detect a phase difference between the third and fourth phases C and D corresponding to the two outputs MC and MD facing each other diagonally among the four divided outputs MA, MB, MC, and MD, and may output up-flag and down-flag signals UPCD and DNCD. An operation of detecting the phase difference and outputting the up-flag and down-flag signals will now be described with reference to FIG. 3.

Figure 3:
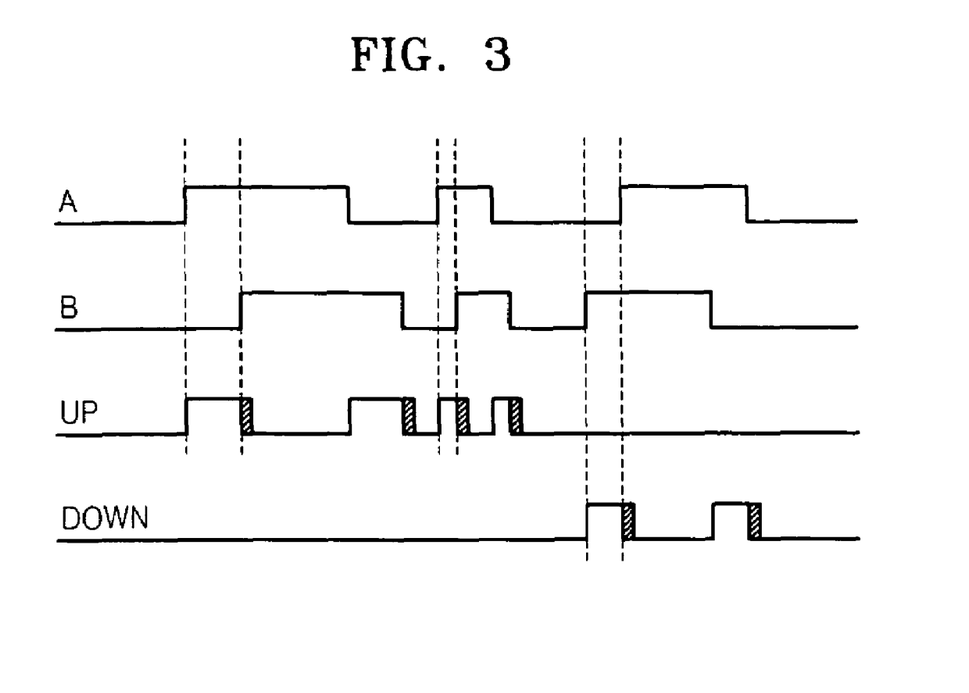
FIG. 3 illustrates a timing diagram of an operation of detecting a phase difference according to an embodiment of the present invention.

FIG. 3 illustrates a timing diagram of the operation of detecting the phase difference between the phases A and B, and of outputting the up-flag and down-flag signals UPAB and DNAB according to an embodiment of the present invention.

Referring to FIG. 3, the first phase difference detector 221 may subtract the second phase B from the first phase A, and may output the first up-flag signal UPAB indicating that the first phase A leads the second phase B. The first phase difference detector 221 may subtract the first phase A from the second phase B, and may output the first down-flag signal DNAB indicating that the first phase A lags the second phase B. The second phase difference detector 223 may output the second up-flag and down-flag signals UPCD and DNCD in the same manner as the first phase difference detector 221. The first up-flag and down-flag signals UPAB and DNAB in response to a plurality of phase clocks may be counted by counting falling edges illustrated in FIG. 3.

The multiple phase clock generator 230 may generate multiple phase clocks CLK1 through CLKN in response to a predetermined clock signal CLK. The clock signal CLK may be a system clock signal used in an optical disk recording reproducer or may be generated using a system clock.

The multiple phase clock generator 230 may continuously delay the clock signals CLK using a plurality of delay cells (not shown) having predetermined delay values, so that outputs of the delay cells may form a multiple phase clock chain that may be continuously delayed by the predetermined delay value of the clock signal CLK.

According to the current embodiment of the present invention, the predetermined delay value may be determined according to kinds of optical disks in response to an external control signal EX_CTRL. That is, when an optical disk is installed, a processor (not shown) may recognize a kind of the optical disk, and may generate the external control signal EX_CTRL to determine the delay value according to the kind of the optical disk. Also, the number of delay cells may be determined according to kinds of optical disks and the delay value in response to the external control signal EX_CTRL.

For example, if the kind of the optical disk installed is a digital versatile disc (DVD), the processor may generate the external control signal EX_CTRL to determine the delay value and number of delay cells corresponding to the speed of the DVD.

Referring to FIG. 2, if the multiple phase clock generator 230 includes N delay cells having a delay value X ns, it may generate N multiple phase clocks each having the delay value X ns. Therefore, if the multiple phase clock generator 230 generates a plurality of phase clocks using a clock signal of 100 MHz, it may actually use N×100 MHz clocks with an interval of X ns.

Figure 4:
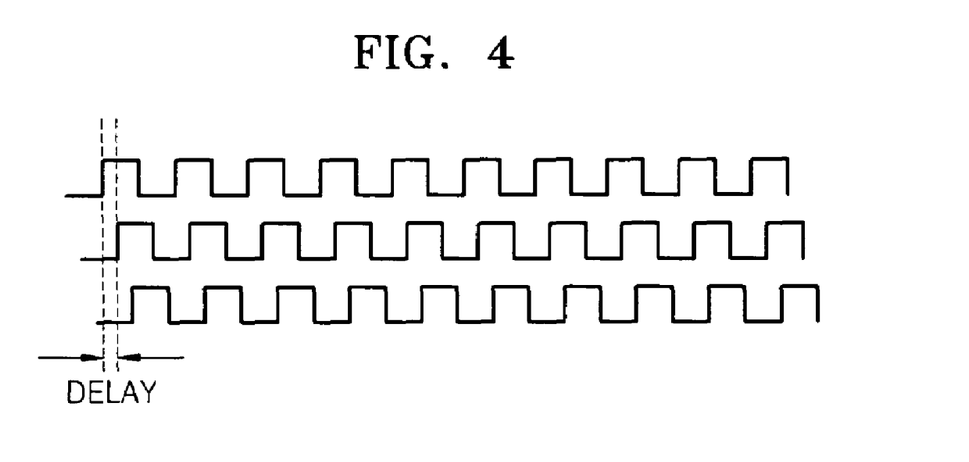
FIG. 4 illustrates a timing diagram of a plurality of phase clocks according to an embodiment of the present invention.

FIG. 4 illustrates a timing diagram of a plurality of phase clocks according to an embodiment of the present invention.

Referring to FIG. 4, the multiple phase clock generator 230 may generate the plurality of phase clocks, which may be respectively delayed by predetermined delay values.

The phase error detector 295 may count phase differences in response to each of the plurality of phase clocks, may sum the counted phase differences, and may detect a phase error.

Since phase error detector 295 may detect the phase error by counting phase differences, if the speed of an optical disk increases, the frequency of phase differences increases. Therefore, the frequency of a clock signal may also be high in order to count phase differences having a high frequency. The phase error detector 295 detects the phase error by responding to falling edges, indicated by the cross-hatched portions in FIG. 3 of the first up-flag and down-flag signals UPAB and DNAB to the predetermined clock signal CLK.

If the speed of the optical disk increases, the frequency of the first up-flag and down-flag signals UPAB and DNAB also rapidly increases. However, it is very difficult to increase the frequency of the clock signal CLK.

Therefore, embodiments of the present invention may provide a method of detecting a phase error of a high-speed optical disk without increasing the frequency of a clock signal. Since a multiple phase clock is the same as a clock signal having a high frequency, the present invention provides a method of counting phase differences using the plurality of phase clocks.

The phase error detector 295 may include a counting unit 250, a latching unit 260, a summing unit 270, and a phase error sum storage unit 280. The counting unit 250 may count phase differences in response to each of the plurality of phase clocks CLK1 through CLKN, and may be reset in response to a predetermined control signal CTRL.

The counting unit 250 may include a first counting unit and a second counting unit. The first counting unit may include a first AB counter through an $N^{th}$ AB counter that up/down count the up/down number of the first up-flag and down-flag signals UPAB and DNAB in response to each of the plurality of phase clocks CLK1 through CLKN.

The second counting unit may include a first CD counter through an $N^{th}$ CD counter that up/down count the up/down number of the second up-flag and down-flag signals UPCD and DNCD in response to each of the plurality of phase clocks CLK1 through CLKN.

The latching unit 260 may update the counted values in response to the control signal CTRL, and may store the updated counted values. The latching unit 260 may include a first latching unit and a second latching unit. The first latching unit may include a first AB latch through an $N^{th}$ AB latch that update the values counted by the first AB counter through the $N^{th}$ AB counter in response to the control signal CTRL, and may store the updated counted values. The second latching unit may include a first CD latch through an $N^{th}$ CD latch that update the values counted by the first CD counter through the $N^{th}$ CD counter in response to the control signal CTRL, and store the updated counted values.

The control signal CTRL that counts phase differences according to kinds of optical disks may be a pulse signal having a sufficient period. Therefore, in response to rising edges of the control signal CTRL, the first AB counter through the $N^{th}$ AB counter and the first CD counter through the $N^{th}$ CD counter may count the values, the first AB latch through the $N^{th}$ AB latch and the first CD latch through an $N^{th}$ CD latch may update the counted values and store the updated counted values, and the first AB counter through the $N^{th}$ AB counter and the first CD counter through the $N^{th}$ CD counter may be reset in falling edges of the control signal CTRL, and count phase differences.

The control signal CTRL may be generated in response to the external control signal EXCTRL according to kinds of optical disks. According to the current embodiment of the present invention, the control signal CTRL may be generated every clock period of the clock signal CLK.

The summing unit 270 may sum the counted values stored in the first AB latch through the $N^{th}$ AB latch and the first CD latch through an $N^{th}$ CD latch during the period of the control signal CTRL, i.e., during the reset period, which is the time period from the time when the first AB counter through the $N^{th}$ AB counter and the first CD counter through the $N^{th}$ CD counter is reset to the time when the first AB counter through the $N^{th}$ AB counter and the first CD counter through the $N^{th}$ CD counter is next reset.

The phase error sum storage unit 280 may update the value summed by the summing unit 270 in response to the control signal CTRL, and may store a phase error sum.

The tracking error signal output unit 290 may low-pass-filter the phase error sum in response to the control signal CTRL, and may output the tracking error signal DPD_TE. Therefore, according to the current embodiment of the present invention, the tracking error signal output unit 290 may include a low pass filtered signal.

The tracking error signal output unit 290 may further include an offset controller (not shown) that may control an offset of an output of the low pass filter according to kinds of optical disks in response to the external control signal EXCTRL.

The offset controller may include an offset storage unit (not shown) and an adder (not shown). The offset storage unit may store the offset controlled according to the kind of the optical disk in response to the external control signal EX_CTRL, and the adder may add the offset to a digital control voltage, thereby controlling the offset. The tracking error signal output unit 290 may further include a gain controller (not shown) that may control a gain of the output of the low pass filter according to kinds of optical disks in response to the external control signal EX_CTRL.

Figure 5:
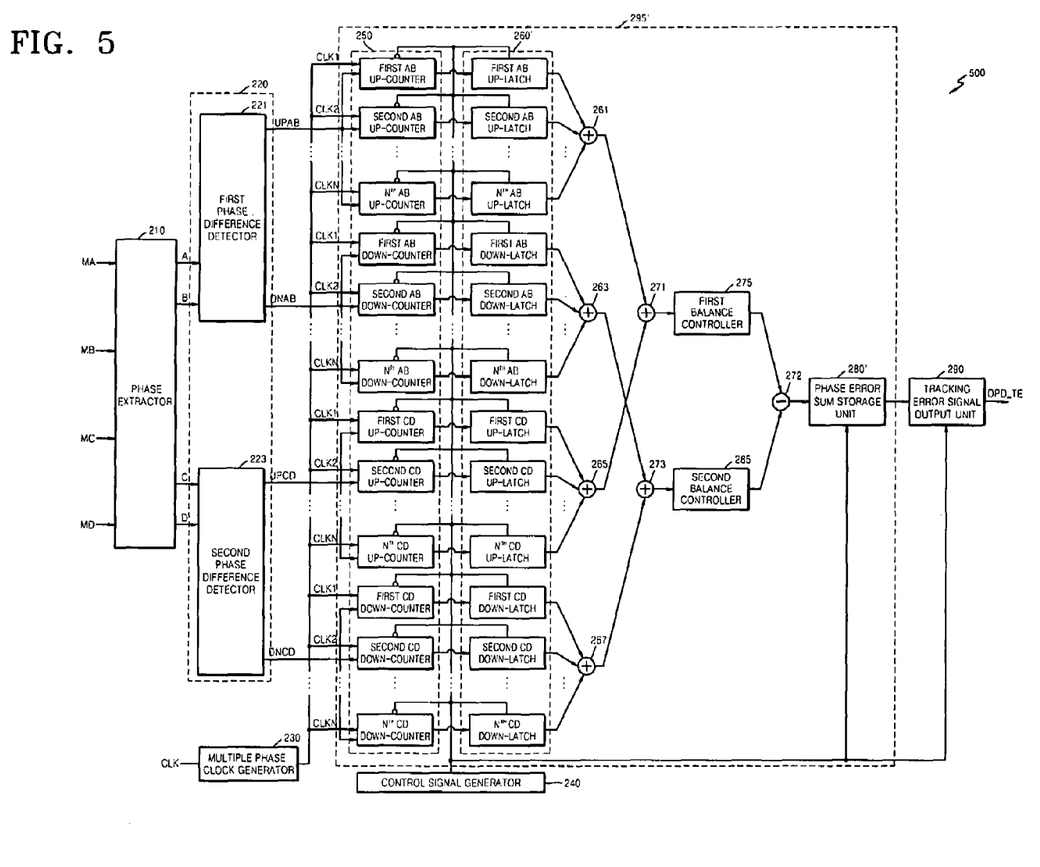
FIG. 5 illustrates a block diagram of an apparatus for detecting a tracking error signal according to another embodiment of the present invention.

FIG. 5 illustrates a block diagram of an apparatus 500 for detecting a tracking error signal according to another embodiment of the present invention. Referring to FIG. 5, the apparatus 500 for detecting the tracking error signal may be the same as the apparatus 200 for detecting the tracking error signal illustrated in FIG. 2, except the constitution of the phase error detector 295. The apparatus 500 for detecting the tracking error signal controls a balance after counting the up/down number of phase differences. The constitution and operation of a phase error detector 295' of the apparatus 500 for detecting the tracking error signal will now be described.

The phase error detector 295' may include a counting unit 250', a latching unit 260', first adders 261 and 263, second adders 265 and 267, an up-adder 271, a down-adder 273, a subtracting unit 272, balance controllers 275 and 285, and a phase error sum storage unit 280'.

The counting unit 250' may count phase differences in response to each of a plurality of phase clocks CLK1 through CLKN, and may be reset in response to a predetermined control signal CTRL.

The counting unit 250' may include a first counting unit and a second counting unit. The first counting unit may include a first up-counting unit and a first down-counting unit.

The first up-counting unit may include a first AB up-counter through an $N^{th}$ AB up-counter that count the up number of a first up-flag signal UPAB in response to each of the plurality of phase clocks CLK1 through CLKN. The first down-counting unit may include a first AB down-counter through an $N^{th}$ AB down-counter that count the down number of a first down-flag signal DNAB in response to each of the plurality of phase clocks CLK1 through CLKN.

The second counting unit may include a second up-counting unit and a second down-counting unit. The second up-counting unit may include a first CD up-counter through an $N^{th}$ CD up-counter that count the up number of a second up-flag signal UPCD in response to each of the plurality of phase clocks CLK1 through CLKN. The second down-counting unit may include a first CD down-counter through an $N^{th}$ CD down-counter that count the down number of a second down-flag signal DNCD in response to each of the plurality of phase clocks CLK1 through CLKN.

The latching unit 260' may update the counted values in response to the control signal CTRL, and may store the updated counted values. The latching unit 260' may include a first latching unit and a second latching unit.

The first latching unit may include a first up-latching unit and a first down-latching unit. The first up-latching unit may include a first AB up-latch through an $N^{th}$ AB up-latch that update the values counted by the first AB up-counter through the $N^{th}$ AB up-counter in response to the control signal CTRL and store the updated counted values. The first down-latching unit may include a first AB down-latch through an $N^{th}$ AB down-latch that update the values counted by the first AB down-counter through the $N^{th}$ AB down-counter in response to the control signal CTRL and store the updated counted values.

The second latching unit may include a second up-latching unit and a second down-latching unit. The second up-latching unit may include a first CD up-latch through an $N^{th}$ CD up-latch that update the values counted by the first CD up-counter through the $N^{th}$ CD up-counter in response to the control signal CTRL and store the updated counted values. The second down-latching unit may include a first CD down-latch through an $N^{th}$ CD down-latch that update the values counted by the first CD down-counter through the $N^{th}$ CD down-counter in response to the control signal CTRL and store the updated counted values.

In response to rising edges of the control signal CTRL, the first AB up-counter through the $N^{th}$ AB up-counter, the first AB down-counter through the $N^{th}$ AB down-counter, the first CD up-counter through the $N^{th}$ CD up-counter, and the first CD down-counter through the $N^{th}$ CD down-counter may count the values. The first AB up-latch through the $N^{th}$ AB up-latch, the first AB down-latch through the $N^{th}$ AB down-latch, the first CD up-latch through an $N^{th}$ CD latch up-update, and the first CD down-latch through an $N^{th}$ CD latch down-latch may update the counted values, and may store the updated counted value.

The first AB up-counter through the $N^{th}$ AB up-counter, the first AB down-counter through the $N^{th}$ AB down-counter, the first CD up-counter through the $N^{th}$ CD up-counter, and the first CD down-counter through the $N^{th}$ CD down-counter may be reset in falling edges of the control signal CTRL, and may count phase differences.

The first adder 261 may be a first up-adder 261 and the first adder 263 may be a first down-adder that count the up number of the first up-flag signal UPAB and the down number of the first down-flag signal DNAB, respectively. The second adder 265 may be a second up-adder and the second adder 267 may be a second down-adder that count the up number of the second up-flag signal UPCD and the down number of the second down-flag signal DNCD, respectively.

More specifically, the first up-adder 261 may add the counted values stored in the first AB up-latch through the $N^{th}$ AB up-latch during the reset period of the first AB up-counter through the $N^{th}$ AB up-counter. The first down-adder 263 may add the counted values stored in the first AB down-latch through the $N^{th}$ AB down-latch during the reset period of the first AB down-counter through the $N^{th}$ AB down-counter.

The second up-adder 265 may add the counted values stored in the first CD up-latch through the $N^{th}$ CD up-latch during the reset period of the first CD up-counter through the $N^{th}$ CD up-counter. The second down-adder 267 may add the counted values stored in the first CD down-latch through the $N^{th}$ CD down-latch during the reset period of the first CD down-counter through the $N^{th}$ CD down-counter.

The up-adder 271 may add the values added by the first and second up-adders 261 and 265. The down-adder 273 may add the values added by the first and second down-adders 263 and 267.

The first and second balance controllers 275 and 285 may control balance of outputs of the up-adder 271 and the down-adder 273, respectively. That is, the first balance controller 275 may multiply a predetermined gain to the output of the up-adder 271 to control the balance of the output of the up-adder 271. The second balance controller 285 may multiply a predetermined gain to the output of the down-adder 273 to control the balance of the output of the down-adder 273.

The predetermined gain multiplied by the first and second balance controllers 275 and 285 may be a value controlled according to kinds and states of optical disks. According to the current embodiment of the present invention, the gain may be controlled by the external control signal EX_CTRL.

The subtracting unit 272 may finally subtract the outputs of the first and second balance controllers 275 and 285, and may produce the subtracted output to the phase error sum storage unit 280'. That is, the subtracting unit 272 may subtract the sum of the balance-controlled down numbers from the sum of the balance-controlled up numbers to detect a phase difference.

The constitution and operation of the apparatus 500 for detecting the tracking error signal after the phase error sum storage unit 280' may be the same as those of the apparatus 200 for detecting the tracking error signal illustrated in FIG. 2, and the description thereof is omitted.

According to embodiments of the present invention, an apparatus for detecting a tracking error signal may detect a phase error of a phase extracted from a digital region, thereby making it easier to realize a system on chip (SoC) and simplifying a system for reproducing optical disk recordings. Also, according to embodiments of the present invention the apparatus for detecting the tracking error signal may realize an analog circuit as a digital circuit, thereby reducing manufacturing costs and providing a constant distribution of element characteristics, thereby improving product quality and reducing power consumption.

Exemplary embodiments of the present invention have been disclosed herein, and although specific terms are employed, they are used and are to be interpreted in a generic and descriptive sense only and not for purpose of limitation. While the above embodiments have been described relative to a hardware implementation, the present invention may also be realized by an article of manufacture having a machine accessible medium including data that, when accessed by a machine, cause the machine to detect a tracking error signal in accordance with embodiments of the present invention. Accordingly, it will be understood by those of ordinary skill in the art that various changes in form and details may be made without departing from the spirit and scope of the present invention as set forth in the following claims.

What is claimed is:

1. An apparatus for detecting a tracking error signal, comprising:

a phase extractor receiving four divided outputs in response to light reflected from an optical disk and extracting four respective divided phases;

a phase difference detector for detecting phase differences between two phases among four divided phases;

a multiple phase clock generator for generating a plurality of phase clocks in response to a predetermined clock signal;

a phase error detector for counting phase differences in response to each of the plurality of phase clocks, summing the counted phase differences, and detecting a phase error; and a tracking error output unit for detecting the tracking error signal in response to the phase error and outputting the detected tracking error signal.

2. The apparatus as claimed in claim 1, wherein the phase difference detector comprises:

a first phase difference detector for detecting a phase difference between first and second phases corresponding to the two outputs facing each other diagonally among the at least four divided outputs; and a second phase difference detector for detecting a phase difference between third and fourth phases corresponding to two other outputs facing each other diagonally among the at least four divided outputs.

3. The apparatus as claimed in claim 2, wherein the first phase difference detector is configured to output a first up-flag signal indicating that the first phase leads the second phase and a first down-flag signal indicating that the first phase lags the second phase as the phase difference, and the second phase difference detector is configured to output a second up-flag signal indicating that the third phase leads the fourth phase and a second down-flag signal indicating that the third phase lags the fourth phase as the phase difference.

4. The apparatus as claimed in claim 2, wherein the phase error detector counts phase differences by counting up/down numbers of the first and second phase differences in response to each of the plurality of phase clocks, summing up numbers of the first and second phase differences and down numbers of the first and second phase differences, respectively, and detecting the phase error in response to a difference between the summed up and down numbers.

5. The apparatus as claimed in claim 4, wherein the phase error detector further comprises a balance controller for controlling a balance between the summed up number of the first and second phase differences and the summed down number of the first and second phase differences.

6. The apparatus as claimed in claim 5, wherein the balance controller controls the balance by multiplying a predetermined gain to the summed up number of the first and second phase differences and the summed down number of the first and second phase differences.

7. The apparatus as claimed in claim 1, wherein the multiple phase clock generator comprises a plurality of delay cells having a predetermined delay value, in which each of the plurality of delay cells generate each of the plurality of phase clocks.

8. The apparatus as claimed in claim 7, wherein the predetermined delay value is determined according to kinds of optical disks in response to an external control signal.

9. The apparatus as claimed in claim 8, wherein the number of the plurality of delay cells is determined according to the kinds of optical disks and the delay value in response to the external control signal.

10. The apparatus as claimed in claim 1, wherein the phase error detector comprises:

a counting unit for counting phase differences in response to each of the plurality of phase clocks and being reset in response to a control signal;

a latching unit for updating the counted values in response to the control signal and storing the updated counted values;

a summing unit for summing the counted values stored in the latching unit; and a phase error sum storage unit for updating the value summed by the summing unit in response to the control signal and stores a phase error sum, wherein the control signal is generated at a predetermined period according to kinds of optical disks.

11. The apparatus as claimed in claim 10, wherein the counting unit comprises:

a first counting unit including a plurality of counters that up/down counts the up/down number of first up-flag and down-flag signals in response to each of the plurality of phase clocks; and a second counting unit including a plurality of counters that up/down counts the up/down number of second up-flag and down-flag signals in response to each of the plurality of phase clocks.

12. The apparatus as claimed in claim 11, wherein the latching unit comprises:

a first latching unit including a plurality of latches that updates the values counted by each of the counters of the first counting unit in response to the control signal and storing the updated counted values; and a second latching unit including a plurality of latches that updates the values counted by each of the counters of the second counting in response to the control signal and storing the updated counted values.

13. The apparatus as claimed in claim 1, wherein the tracking error output unit comprises a low pass filter that low-pass-filters the phase error sum in response to a control signal and outputs the tracking error signal, wherein the control signal is generated at a predetermined period according to kinds of optical disks.

14. The apparatus as claimed in claim 13, wherein the tracking error output unit further comprises an offset controller that controls an offset of an output of the low pass filter according to the kinds of optical disks in response to an external control signal.

15. The apparatus as claimed in claim 13, wherein the tracking error output unit further comprises a gain controller that controls a gain of the output of the low pass filter according to the kinds of optical disks in response to an external control signal.

16. A method of detecting a tracking error signal, the method comprising:

receiving four divided outputs in response to light reflected from an optical disk and extracting respective divided phases;

detecting phase differences between two phases among the divided phases;

generating a plurality of phase clocks in response to a predetermined clock signal;

counting the phase differences in response to each of the plurality of phase clocks, summing the counted phase differences, and detecting a phase error; and detecting the tracking error signal in response to the phase error and outputting the detected tracking error signal.

17. The method as claimed in claim 16, wherein extracting the divided phases comprises:

detecting a phase difference between first and second phases corresponding to two outputs facing each other diagonally among the divided outputs; and detecting a phase difference between the third and fourth phases corresponding to the other two outputs facing each other diagonally among the four divided outputs.

18. The method as claimed in claim 17, wherein the detecting of the phase difference between the first and second phases outputs a first up-flag signal indicating that the first phase leads the second phase and a first down-flag signal indicating that the first phase lags the second phase as the phase difference, and the detecting of the phase difference between the third and fourth phases outputs a second up-flag signal indicating that the third phase leads the fourth phase and a second down-flag signal indicating that the third phase lags the fourth phase as the phase difference.

19. The method as claimed in claim 17, wherein detecting of the phase difference comprises:

counting phase differences in response to each of the plurality of phase clocks;

updating the counted values in response to a control signal and storing the updated counted values;

summing the counted values; and updating the summed value in response to the control signal and storing a phase error sum, wherein the control signal is generated at a predetermined period according to kinds of optical disks.

20. The method as claimed in claim 19, wherein the counting of phase differences comprises:

up/down counting the up/down number of first up-flag and down-flag signals in response to each of the plurality of phase clocks; and up/down counting the up/down number of second up-flag and down-flag signals in response to each of the plurality of phase clocks.

21. The method as claimed in claim 16, wherein the plurality of phase clocks are generated by delaying the clock signal using a plurality of delay cells having a predetermined delay value.

22. The method as claimed in claim 21, wherein the predetermined delay value is determined according to kinds of optical disks.

23. The method as claimed in claim 16, wherein the outputting of the tracking error signal comprises low-pass-filtering the phase error sum in response to a control signal, wherein the control signal is generated at a predetermined period according to kinds of optical disks.

24. The method as claimed in claim 23, wherein the outputting of the tracking error signal further comprises controlling an offset of the low-pass-filtered output according to the kinds of optical disks in response to an external control signal.

25. The method as claimed in claim 23, wherein the outputting of the tracking error signal further comprises controlling a gain of the low-pass-filtered output according to the kinds of optical disks in response to an external control signal.

* * * * *